United States Patent [19]

Neumann

[11] Patent Number: 4,652,123
[45] Date of Patent: Mar. 24, 1987

[54] METHOD AND APPARATUS FOR MEASURING ABSOLUTE FIBER JUNCTION LOSS

[75] Inventor: Richard L. Neumann, Ottawa, Canada

[73] Assignee: Northern Telecom Limited, Montreal, Canada

[21] Appl. No.: 665,653

[22] Filed: Oct. 29, 1984

[51] Int. Cl.[4] ..................... G01N 21/84; G01N 21/59
[52] U.S. Cl. .................................................. 356/73.1
[58] Field of Search ....................................... 356/73.1

[56] References Cited

U.S. PATENT DOCUMENTS 4,183,666 1/1980 Tahara et al. ..................... 356/73.1

FOREIGN PATENT DOCUMENTS 2847488 5/1980 Fed. Rep. of Germany ..... 356/73.1

OTHER PUBLICATIONS

Kohanzadeh "Hot Splices of Optical Waveguide Fibers", Applied Optics, Mar. 1976, vol. 15, #3, pp. 793–795.

Primary Examiner—Vincent P. McGraw
Attorney, Agent, or Firm—Schwartz, Jeffery, Schwaab, Mack, Blumenthal & Evans

[57] ABSTRACT

For use in measuring the absolute loss at a junction site between two fibers, two devices for directing light into the fiber from points upstream and downstream of the junction site are coupled to the fiber and remain in their coupled positions throughout the measurement procedure. A detector unit is then coupled to the fiber just downstream of the junction and used to measure optical powers $P_{21}$ and $P_{22}$ resulting from the upstream and downstream launching units respectively. A detector unit is then coupled to the fiber just upstream of the junction to measure power $P_{11}$ and $P_{12}$, respectively, from the two launching units. Loss at the junction is then computed from the relationship, splice loss:

$$L^2 = P_{21}P_{12}/P_{11}P_{22}$$

A two way detector compensated for bidirectional detection is used. Both the light launching and detection units can be easily coupled to the fiber to permit local, non-destructive splice loss measurement.

8 Claims, 4 Drawing Figures

METHOD AND APPARATUS FOR MEASURING ABSOLUTE FIBER JUNCTION LOSS

This invention relates to a method and apparatus for measuring the absolute light loss at a junction site between two fibers. The invention has particular application in making a fiber splice or connection.

Particularly in splicing or connecting monomode fiber which has a very small core of the order of 10 microns in diameter, it is essential to obtain core alignment at the sites of splices or connections. It is known to maximize optical transmission between two optical waveguides at an optical splice or connection site by injecting light into one waveguide upstream of the splice site and monitoring the corresponding light output at a location downstream of the splice site. At the splice site itself, the two ends of the first and second waveguides are manipulated to positions where light transmission from one waveguide to the other waveguide is maximized.

Although many systems exist which allegedly can be operated to obtain maximum light transmission at a fiber junction, no satisfactory systems are known for measuring absolute splice loss. One known system for measuring absolute splice loss is described by Y. Kato et al, Electronic Letters, October 1982, volume 18, page 22. Using this method, two fiber ends at a junction site are brought together with a fluid refractive index matched to the fiber cores located between the two fiber ends. Light is injected into the remote end of the upstream fiber and output light is measured at the remote end of the downstream fiber. Then the splice is made and the measurement repeated. Assuming the first measurement corresponds to zero loss, the nominal absolute splice loss can be derived. One disadvantage of the method is that access is required to the remote ends of both fibers. Another disadvantage is that absolute splice loss cannot be measured after the splice has been made.

According to one aspect of the present invention there is provided a method for measuring absolute light loss at a junction between first and second fiber parts of an optical transmission line, the method comprising coupling first and second light launching units respectively to the first and second fiber parts, coupling a light detector to one of the fiber parts at a location between the junction and the launching unit coupled to said one part, measuring the light powers $P_{21}$ and $P_{22}$ at the detector produced by the first and second launching units, respectively, coupling a light detector unit to the other fiber part, measuring the light powers $P_{11}$ and $P_{12}$ produced by the first and second light launching units respectively at the detector, and computing the splice loss:

$$L^2 = P_{21}P_{12}/P_{11}P_{22}$$

In use, the light launching units are fixed in position during the measurement procedure and a single light detector unit is used. The detector is preferably associated with a compensating electrical circuit to compensate for any variation in detector efficiency dependent on whether light is incident on the detector from an upstream or downstream direction.

Suitable light launching and detection devices are as described in our co-pending patent application in the name of Brian Susumu KAWASAKI et al, filed Oct. 29, 1984 and assigned Ser. No. 666,626. The couplers disclosed in this specification each have a transparent body through which a passage extends. The passage accommodates a waveguide and has an angled section with the apex of the angle sufficiently sharp that light propagating along the waveguide is emitted as a beam at the angled section. In the detector unit the light is detected by a photodetector while in the light launching unit light from a light emitting source is injected into the waveguide at the fiber angle. Particularly for the present invention, the detection unit is bidirectional and symmetric having a pair of photodetectors.

An embodiment of the invention will now be described by way of example, with reference to the accompanying drawings in which.

Figure 1:
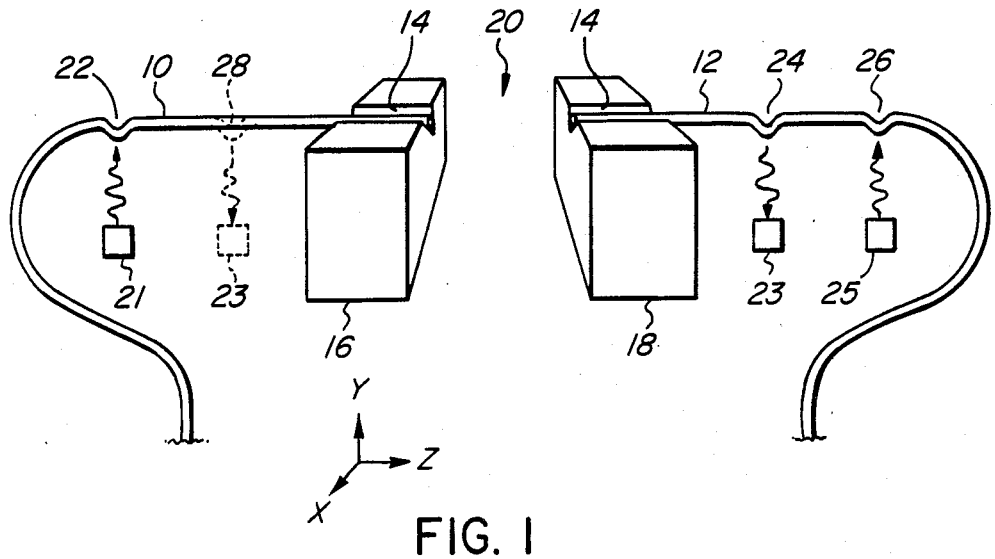
FIG. 1 shows the sequence of operations used in a method according to the present invention for measuring absolute fiber junction loss.

Referring to FIG. 1 in detail, two fibers 10, 12 which are to be spliced are fixed within V-grooves 14 in respective jigs 16, 18. The V-grooves 14 are oriented so that the fiber longitudinal axes are parallel. The jig 16 is moveable in x, y and z directions relative to the fixed jig 18 where the z direction is aligned with the longitudinal axes of the fibers.

In preparing to effect a fusion splice between the two fiber ends, it is necessary to obtain accurate fiber core alignment and to have the fiber end surfaces positioned close together. To maximize transmission at the splice site 20, light is launched from unit 21 at a position 22 upstream of the splice site and detected by detector unit 23 at a position 24 downstream of the splice site. The fiber ends at the splice site 20 are then manipulated by moving the jig 16 relative to the jig 18 until light transmission across the splice site is maximized. To measure the absolute light loss at the splice, a second light launching unit 25 is positioned at a position 26 on the downstream side of the detector 23.

The light power $P_{21}$ detected from light launcher 21 is measured at detector 23 and then light power $P_{22}$ detected from the light launcher 25 is measured. Subsequently, the detector 23 is moved from its position on the downstream side of the junction zone 20 to a position 28 on the upstream side of the junction zone. Again, the light power $P_{11}$ from the launcher 21 and the light power $P_{12}$ from the light launcher 25 are measured.

Then power $P_{21}$ equals the launch efficiency of launcher 21 times the detector efficiency of detector 23 at the downstream position times the junction loss $\alpha$. $P_{22}$ equals the launch efficiency of launcher 25 times the detector efficiency of 23 at the downstream position. $P_{12}$ equals the launch efficiency of launcher 25 times the detector efficiency of detector 23 at the upstream position times splice loss $\alpha$. $P_{11}$ equals the launch efficiency of launcher 21 times the detector efficiency of detector 23 at the upstream position.

The splice loss $\alpha$ is given by the expression:

$$P_{21}P_{12}/P_{11}P_{22} = (\text{splice loss } \alpha)^2 \ldots \qquad \text{Equation 1}$$

Figure 2A:
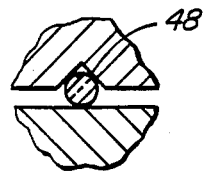
FIG. 2A is a detail on the line II—II of FIG. 2.
Figure 2:
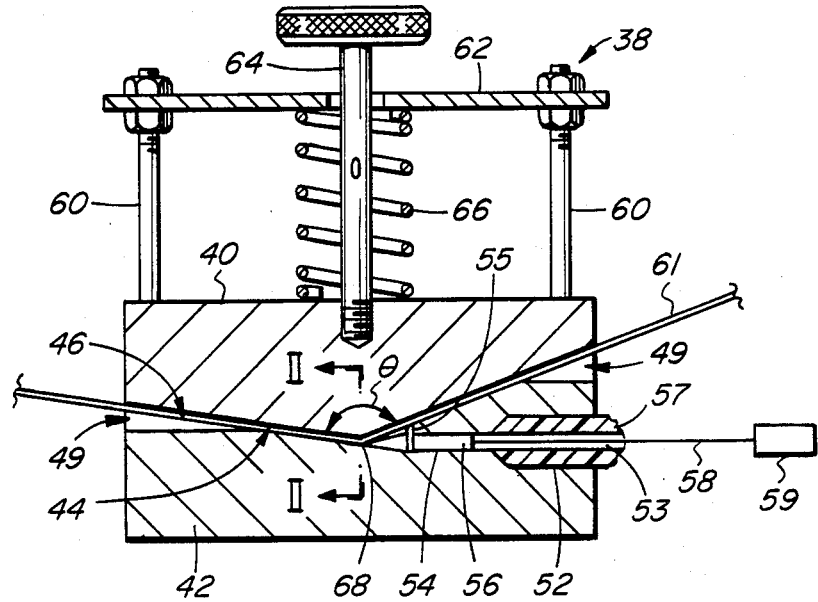
FIG. 2 shows a launch unit.
Figure 3:
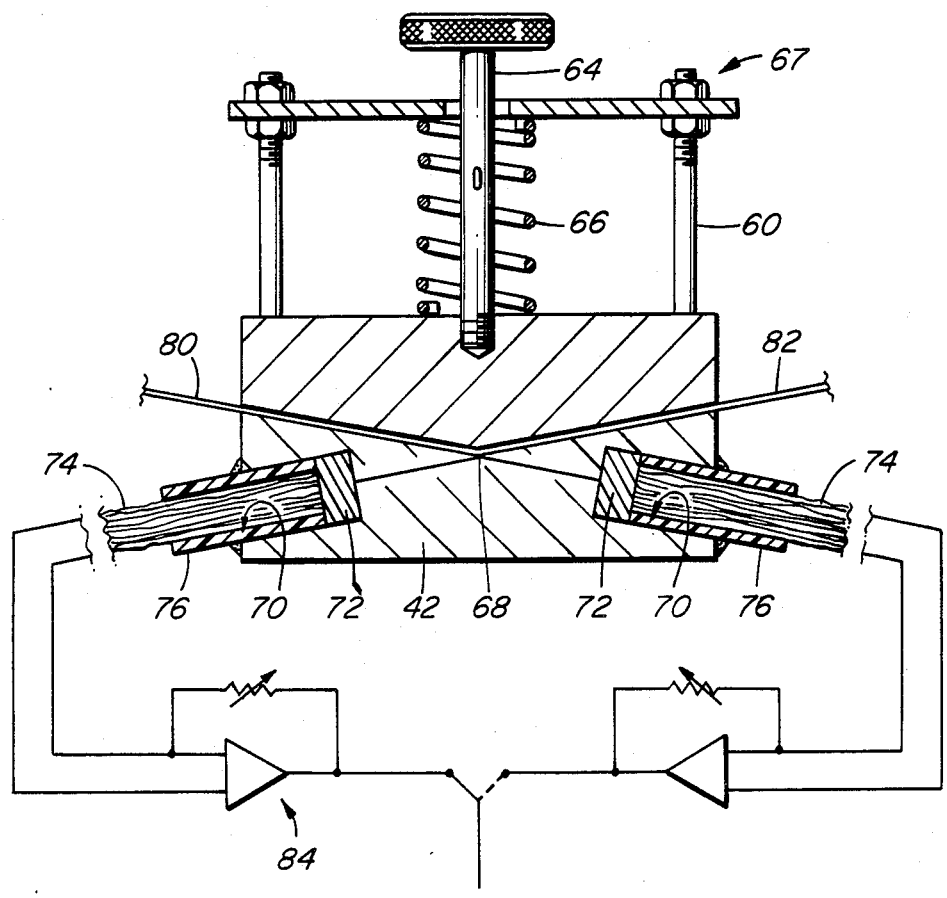
FIG. 3 shows a light detection unit.

Referring to FIGS. 2 and 3 there is shown a suitable launcher and detector unit for use in this method.

The launching coupler 38 has a Plexiglass (Trade Mark) block having two parts 40, 42. The two parts have complementary angled surfaces 44, 46 respectively. Extending along the surface of the part 10 is a V-section groove 48 (see detail on II—II) having a depth of 100 microns and an included angle of 60°. The two parts have planar surface sections meeting at an angle of 146°. At the angled region, the apex of the angle in both of the parts has a radius of curvature of 125 microns. The lower part has notches 49 which are 300 microns in width and which are vertically aligned with the groove 48.

Extending into the lower block is a bore 52 of ⅛ inch diameter which terminates in a further bore 54 of 1/16 inch diameter. A graded refractive index rod 56 which functions as a converging lens is lodged in the smaller bore and a multimode pigtail fiber 58 with protective jacketing is secured by adhesive within a ferrule 53 which is itself mounted by epoxy 57 within the wider bore. The end of the pigtail fiber 58 projects from the ferrule 53 and is aligned with the axis of the graded refractive index rod 56. The end surface of the rod 56 remote from the fiber 58 adheres to a surface produced by forming a groove 55 within the block part 42, polishing the groove site, and filling in the groove except where it is aligned with the rod 56. A UV cured adhesive which is refractive index matched to the block is used. The other end of the fiber 58 is secured in a position in which it receives the output of a GaAlAs semiconductor laser 59 having an output wavelength of 0.84 microns.

The block is rectangular in plan and has two rods 60 which extend down through the top part of the block 40 and are anchored within the lower part 42. A plate 62 is mounted horizontally at the top of the two rods and a locking pin 64 extends down through the plate 62 and has a lower end engaged within a centrally disposed hole in the top of the block part 40. A compression spring 66 extends between the undersurface of the plate 62 and the top surface of the block part 40 to press the two parts of the block together. To release the two parts 40, 42 from one another, the pin 64 is twisted to a position allowing it to be withdrawn upwardly and partially through the plate 62 and is then twisted to lock the pin in that raised position. The top part 40 of the block can then be reciprocated along the vertical rods 60.

In use, an optical fiber 61 is positioned so as to extend between notches 49 and top body part 40 is slid down the rods 60 and locked against the body part 42 using the resilient pin 64. Because the notches 49 are aligned with groove 48, the fiber 61 automatically locates within the groove 48 as the two body parts 40, 42 come together. The jacketed fiber is 250 microns in diameter and the V-groove 48 is 100 microns in depth so that the fiber 61 projects beyond the groove 48 by about the thickness of the acrylate fiber jacketing and is secured against the lower block part 42. A relatively sharply angled region 68 is developed in the fiber 61, the radius of curvature of the fiber at the fiber angle 68 being of the order of 125 microns. The lens 56 is positioned so as to focus light from the pigtail fiber 58 directly at the fiber angle 68 which is as sharp an angle as possible commensurate with limiting short term stress on the fiber 61 below that which might result in fracture. By ensuring that the injected light is properly focussed at the fiber angle and by ensuring that the apex of the fiber angle is sharp, light loss downstream of the light entry point is minimized. A short wavelength laser 59 is used since the number of modes which can be launched into a fiber from it is proportional to the inverse of the laser wavelength. In addition the local launch device 38 is for use with a photocell and one of the more sensitive types of light detector is the silicon photodetector which is short wavelength sensitive. Typically the light coupled at the fiber angle 68 is about 25 dB down on the light level within pigtail fibers 58.

The choice of fiber angle is important since it is a compromise between minimizing beam size and minimizing fiber stress. The fiber included angle of 146°, the angle between the fiber 61 the axis of the launch device of 24.5°, and the apex radius of 125 microns are specific values which depend on the relative refractive index of the fiber 61, the fiber jacket material and coupler block. They depend also on the ability of the fiber to withstand bending stresses.

In the system of FIG. 1, the second light launcher is reversed in comparison with the first launcher so that in each case the launchers 21, 25 direct light towards the junction site 20.

Referring to FIG. 3, the detection coupler 67 is similar in many respects to the FIG. 2 launching coupler. One-half inch bores 70 are formed in the block part 42 in the plane of the groove 48. Within each of the bores 70 is mounted a photocell 72 having a light sensitive surface facing towards the fiber angle 68. Leads 74 from the photodetectors 72 are taken through protective rubber sleeves 76 which are secured to an end face of the block 42. The photocells 72 are for example, silicon photodetector/preamplifier combinations available from Silicon Detector Corporation under the product number SD-100-41-11-231. In use, light propagating through the fiber from the left as shown in FIG. 3 is emitted from the fiber angle 68 and is directed as a narrow beam towards the photosensitive face of the right hand photocell 72. Typically the light detected is 5 to 10 dB down on the light level on the upstream side of the coupler 67. The detector output level depends for example on whether the plastic coating at the fiber angle 68 is of a regular thickness. Also it is common practice to colour code fibers by colouring the plastic jacket material and some colouring materials may be more absorbent than others. In the FIG. 3 coupler, light propagating through the fiber from the right is emitted from the fiber angle 68 and directed to the left hand photocell 72. Ideally the detector device 67 is symmetrical in structure and operation so that a predetermined light input from the left produces an electrical output signal which is identical in level to that produced if the same light enters the coupler 67 from the right hand part 82 of the test fiber. However achieving this is very difficult so the characteristics of the two photodetectors are compared beforehand and a compensation circuit 84 is used to equalize the output signal in response to a predetermined input light level regardless of the direction from which the light originates.

The FIG. 1 embodiment has two launch units 21 and 25 and a bidirectional detector unit 23. The launch units 21, 25 are not moved throughout the measuring process which is particularly desirable in measuring absolute fiber junction loss since it surmounts the repeatability problem of using the fiber bending mechanism twice. Thus if light directed into a fiber is constant and the fiber is bent in the FIG. 2 coupler and the light output measured at separate times with the fiber being removed from the coupler in the intervening period, then the detected light will rarely be within 1/10 dB for the two measurements. By maintaining the launchers permanently in place during the full measurement sequence then there is no repeatability problem as far as the launchers are concerned. A repeatability inaccuracy is introduced by the two-way detector but it is of little effect.

In a variation of the FIG. 1 system, one-way detectors are located on opposite sides of the junction site and are maintained permanently in place while measurement takes place. A two-way launcher is then located between the first detector and the junction site and corresponding powers $P_{11}$ and $P_{21}$ are measured at the respective detectors. The launcher is moved to the opposite side of the junction site and corresponding light powers $P_{12}$ and $P_{22}$ are measured at the respective detectors. The splice loss at the junction site is then provided by Equation 1 recited previously. In this latter case the two-way launcher must be symmetric. Thus it must launch the same power or a known power ratio in both directions.

Although the exemplary emabodiment of the invention is specifically described in the context of a fiber splice and in particular at a time before the splice has been made, it will be appreciated that the method can be used whenever two fibers are to be positioned so that some light from one fiber is to be coupled into the other fiber. Moreover an advantage of the invention is that splice loss can be measured after a splice has been made without destroying the fibers or the splice.

What is claimed is:

1. A method for measuring absolute light loss at a junction between first and second fiber parts of an optical transmission line, the method comprising coupling first and second light launching units respectively to the first and second fiber parts, coupling a light detector to one of the fiber parts at a location between the junction and the launching unit coupled to said one part, measuring the light powers $P_{21}$ and $P_{22}$ at the detector produced by the first and second launching units respectively, removing the light detector unit from said one fiber part and coupling a light detector unit to the other fiber part at a location between the junction and the launching unit coupled to said other part, measuring the light powers $P_{11}$ and $P_{12}$ produced by the first and second light launching units respectively at the detector, and computing the splice loss:

$$L^2 = P_{21}P_{12}/P_{11}P_{22}$$

2. A method as claimed in claim 1 in which the light launching units are fixed in position during the measurement procedure and a single light detector unit is used firstly to measure the light powers $P_{21}$ and $P_{22}$ at the location between the junction end and the launching unit of said one fiber part and is subsequently moved to a location where light powers $P_{11}$ and $P_{12}$ are measured at a location between the junction end and the launching unit coupled to said other fiber part.

3. A method as claimed in claim 2 in which the detector unit has an associated compensation circuit to ensure that identical light powers directed into the two-way detector from opposite directions within the fiber to which it is coupled produce identical output signals.

4. A method of measuring absolute light loss at a junction between first and second parts of an optical transmission line, the method comprising coupling first and second light detection units respectively to the first and second fiber parts, coupling a light launching unit to one of the fiber parts at a location spaced from the junction and the light detector coupled to said one part by forming an angled section in said transmission line and focussing light on said angled section, measuring light powers $P_{11}$ and $P_{21}$ respectively at the first and second detector units produced by the launching unit, coupling a light launching unit to the other fiber part at a location spaced from the junction and the detector unit coupled to the other fiber part by forming an angled section in said transmission line and focussing light on said angled section, measuring the light powers $P_{12}$ and $P_{22}$ produced respectively in the first and second light detecting units, and computing the splice loss:

$$L^2 = P_{21}P_{12}/P_{11}P_{22}$$

5. A method as claimed in claim 4 in which a single light launching unit is used having the capability to launch light in two directions, the light launching unit being compensated to provide identical output regardless of the direction in which light is emitted into the fiber coupled thereto.

6. Apparatus for measuring absolute light loss at a junction between first and second fiber parts of an optical transmission line, the apparatus comprising a first coupler for coupling light into the first part of the optical transmission line at a location upstream of the junction for directing light towards the junction, a second coupler for coupling light into the second part of the optical transmission line to direct light upstream towards the junction, a detector including means for coupling the detector to the transmission line firstly at a location in one fiber part between the junction and the coupler coupled to that fiber part for measuring light power received thereat firstly from one of the launch units and then from the other launch unit, the coupling means being easily disengagable from the fiber to permit the detector to be subsequently coupled at a corresponding location to the other fiber part for measurement of light powers received at the detector unit in said other position from the first and second launch units.

7. Apparatus as claimed in claim 6 wherein the coupling means includes a transparent body through which a passage extends, the passage adapted to accommodate said transmission line and having an angled section with the apex of the angle sufficiently sharp that light propagating along the transmission line is emitted as a beam at the angled section, and means for attaching said body at any point on said transmission line.

8. Apparatus as claimed in claim 6 wherein each of said couplers includes a transparent body through which a passage extends, the passage adapted to accommodate said transmission line and having an angled section with an apex sufficiently sharp that light directed on said apex is transmitted along said transmission line, and means for attaching said body at any point on said transmission line.

* * * * *